United States Patent
Ricketts et al.

(10) Patent No.: US 10,123,482 B2
(45) Date of Patent: Nov. 13, 2018

(54) CORN HEADER HAVING AN AIR FLOW GENERATING CUTTING BLADE FOR AN AGRICULTURAL HARVESTER

(71) Applicant: CNH Industrial America LLC, New Holland, PA (US)

(72) Inventors: Jonathan Ricketts, Coal Valley, IL (US); James Gessel, Geneseo, IL (US)

(73) Assignee: CNH Industrial America LLC, New Holland, PA (US)

( * ) Notice: Subject to any disclaimer, the term of this patent is extended or adjusted under 35 U.S.C. 154(b) by 1 day.

(21) Appl. No.: 15/214,926

(22) Filed: Jul. 20, 2016

(65) Prior Publication Data
US 2018/0020619 A1    Jan. 25, 2018

(51) Int. Cl.
| A01D 63/04 | (2006.01) |
| A01D 41/06 | (2006.01) |
| A01D 41/14 | (2006.01) |
| A01D 45/02 | (2006.01) |

(52) U.S. Cl.
CPC ............ *A01D 63/04* (2013.01); *A01D 41/06* (2013.01); *A01D 41/14* (2013.01); *A01D 45/021* (2013.01)

(58) Field of Classification Search
CPC .. A01D 34/73; A01D 2101/00; A01D 34/733; A01D 34/005; A01D 34/66; A01D 34/63; A01D 34/535; A01D 34/685; Y10S 56/20
See application file for complete search history.

(56) References Cited

U.S. PATENT DOCUMENTS

| 1,656,105 | A | * | 1/1928 | Durkee | A01D 34/66 56/1 |
| 2,662,360 | A | | 12/1953 | Roscoe | |
| 2,672,003 | A | | 3/1954 | Ashton | |
| 2,797,543 | A | | 7/1957 | Rasmussen | |
| 2,809,488 | A | * | 10/1957 | Sewell | A01D 34/005 56/13.8 |
| 2,924,059 | A | * | 2/1960 | Beeston, Jr. | A01D 34/73 56/295 |
| 2,953,888 | A | * | 9/1960 | Phillips, Jr. | A01D 43/08 56/13.4 |
| 3,049,855 | A | * | 8/1962 | McMillan | A01D 34/82 56/295 |

(Continued)

FOREIGN PATENT DOCUMENTS

| CN | 201388393 Y | * | 1/2010 | ............ A01D 45/02 |
| DE | 102011118207 A1 | * | 5/2013 | ........... A01D 45/021 |

(Continued)

OTHER PUBLICATIONS

European Search for European Application No. 17181098.9 dated Dec. 12, 2017 (5 pages).

*Primary Examiner* — Arpad Fabian-Kovacs
(74) *Attorney, Agent, or Firm* — Peter K. Zacharias; Patrick M. Sheldrake (57) ABSTRACT

A header for a combine harvester. The header includes a row unit that includes a pair of stalk rolls, a knife mount and a cutting blade. The knife mount is mounted to the row unit. The cutting blade is mounted to the knife mount and includes a leading cutting edge, and a tail end having a baffle configured to generate a flow of air, wherein the leading cutting edge is forward the tail end upon rotation of the knife mount.

17 Claims, 13 Drawing Sheets

(56) References Cited

U.S. PATENT DOCUMENTS

| | | | | |
|---|---|---|---|---|
| 3,068,633 A * | 12/1962 | Taylor | A01D 34/733 | |
| | | | 56/295 | |
| 3,126,688 A | 3/1964 | Karlsson | | |
| 3,247,656 A * | 4/1966 | Phelps | A01D 34/736 | |
| | | | 56/295 | |
| 3,320,733 A * | 5/1967 | Kirk | A01D 34/63 | |
| | | | 56/295 | |
| 3,385,043 A * | 5/1968 | Seymore | A01D 34/005 | |
| | | | 56/503 | |
| 3,555,790 A | 1/1971 | Quick | | |
| 3,606,743 A | 9/1971 | Johnson | | |
| 3,640,055 A | 2/1972 | Looker | | |
| 3,648,443 A | 3/1972 | Sears | | |
| 3,681,903 A * | 8/1972 | Phillips | A01D 34/73 | |
| | | | 172/555 | |
| 3,762,138 A * | 10/1973 | Michael | A01D 34/733 | |
| | | | 56/295 | |
| 3,766,723 A * | 10/1973 | Maier | A01D 43/081 | |
| | | | 56/13.3 | |
| 3,790,094 A * | 2/1974 | Spicer | B02C 18/06 | |
| | | | 241/101.1 | |
| 3,958,402 A * | 5/1976 | Bouet | A01D 34/63 | |
| | | | 56/295 | |
| 4,292,789 A * | 10/1981 | Mathews | A01D 34/416 | |
| | | | 56/12.7 | |
| 4,297,831 A * | 11/1981 | Pioch | A01D 34/73 | |
| | | | 56/295 | |
| 4,320,617 A * | 3/1982 | Fedeli | A01D 34/73 | |
| | | | 56/13.4 | |
| 4,345,420 A * | 8/1982 | Oosterling | A01D 34/66 | |
| | | | 56/192 | |
| 4,559,769 A * | 12/1985 | Seyerle | A01D 34/73 | |
| | | | 400/496 | |
| 4,827,704 A * | 5/1989 | van der Lely | A01D 34/664 | |
| | | | 56/13.6 | |
| 4,924,665 A * | 5/1990 | Crosley | A01D 34/416 | |
| | | | 56/12.7 | |
| 5,069,025 A * | 12/1991 | Iversen | A01D 34/73 | |
| | | | 56/13.4 | |
| 5,330,114 A * | 7/1994 | Trenkamp | A01D 45/021 | |
| | | | 241/101.77 | |
| 5,673,545 A * | 10/1997 | Friesen | A01D 34/535 | |
| | | | 56/255 | |
| 6,026,635 A * | 2/2000 | Staiger | A01D 34/685 | |
| | | | 56/295 | |
| 6,052,979 A * | 4/2000 | Tutschka | A01D 34/005 | |
| | | | 56/17.5 | |
| 6,058,690 A | 5/2000 | Rutt et al. | | |
| 6,487,840 B1 * | 12/2002 | Turner | A01D 34/005 | |
| | | | 56/295 | |
| 6,840,027 B2 * | 1/2005 | Donselaar | A01D 43/10 | |
| | | | 56/16.4 R | |
| 7,047,717 B1 * | 5/2006 | Wolters | A01D 45/021 | |
| | | | 56/60 | |
| 7,473,171 B1 * | 1/2009 | Schwinn | A01D 41/1243 | |
| | | | 460/111 | |
| 7,490,459 B2 * | 2/2009 | Thompson | A01D 34/733 | |
| | | | 29/402.03 | |
| 7,870,713 B2 | 1/2011 | Schroeder | | |
| 8,371,914 B2 | 2/2013 | Cressoni | | |
| 2001/0003237 A1 * | 6/2001 | Wolters | A01D 45/021 | |
| | | | 56/64 | |
| 2004/0144073 A1 * | 7/2004 | Kappelhoff | A01D 45/025 | |
| | | | 56/103 | |
| 2004/0187463 A1 * | 9/2004 | Eddy | A01D 34/73 | |
| | | | 56/295 | |
| 2010/0162675 A1 * | 7/2010 | Komlosi | A01D 45/021 | |
| | | | 56/51 | |
| 2012/0031066 A1 | 2/2012 | Neudorf et al. | | |
| 2012/0042618 A1 * | 2/2012 | Lohrentz | A01D 45/021 | |
| | | | 56/60 | |
| 2014/0260164 A1 * | 9/2014 | Lohrentz | A01D 45/025 | |
| | | | 56/104 | |
| 2015/0305240 A1 * | 10/2015 | Gessel | A01D 43/08 | |
| | | | 56/52 | |
| 2016/0007530 A1 * | 1/2016 | Awater | A01D 34/73 | |
| | | | 56/52 | |
| 2016/0073585 A1 * | 3/2016 | Cook | A01D 45/028 | |
| | | | 56/10.8 | |
| 2016/0143217 A1 * | 5/2016 | Lohrentz | A01D 45/021 | |
| | | | 56/101 | |
| 2017/0127614 A1 * | 5/2017 | Button | A01D 43/14 | |

FOREIGN PATENT DOCUMENTS

| | | | | |
|---|---|---|---|---|
| EP | 0653152 A1 * | 5/1995 | | A01D 45/021 |
| EP | 1000533 A1 | 5/2000 | | |
| EP | 2415342 A1 | 2/2012 | | |

* cited by examiner

CORN HEADER HAVING AN AIR FLOW GENERATING CUTTING BLADE FOR AN AGRICULTURAL HARVESTER

FIELD OF THE INVENTION

The present invention relates generally to a corn header for use with combine harvesters. In particular, the present invention relates to a corn header having an air assist to prevent or hinder the loss of grain during harvesting operations.

BACKGROUND OF THE INVENTION

An agricultural combine is a machine used to harvest a variety of crops from a field. During a harvesting operation, a corn header assembly at the front of the combine cuts ripened crop from the field. Row dividers direct rows of corn stalks to ear separation chambers or stripping plates and then to an auger. The auger advances the crop towards the vehicle centerline. A feederhouse supporting the corn header assembly transfers the crop material into the combine by way of a conveyor such as an elevator assembly. Processing machinery such as threshing and separating assemblies within the combine further separate, clean and/or transfer the grain for storage.

During harvesting operations, ears of corn hit various parts of the header profile as it is being harvested. This hitting of the ears of corn on these parts cause a degree of shelling, butt shelling, or threshing of the grain from the cob. The grain that gets threshed due to impact is easily lost due to the transport methods that are used to move the grain to the combine, e.g., shelled grain can pass through the plates to the stalk rolls of a row unit and onto the ground.

As such, there is still a need for a header that prevents or hinders the loss of grain during harvesting operations. The present invention addresses the foregoing issues of conventional corn headers.

BRIEF SUMMARY OF THE INVENTION

In accordance with an exemplary embodiment of the present invention, there is provided a header of a combine harvester, the header comprising a row unit, a knife mount, and a cutting blade. The knife mount is mounted to the row unit. The cutting blade is mounted to the knife mount and includes a leading cutting edge, and a tail end configured to generate a flow of air substantially transverse to a major plane of the cutting blade.

In accordance with another exemplary embodiment of the present invention, there is provided a header of a combine harvester, the header comprising a frame and a row unit extending forwardly of the frame. The row unit includes a deck plate, a hood, and a row divider. The header further includes a system for generating a pressurized air flow configured to blow crop material away from the row unit.

In accordance with yet another exemplary embodiment of the present invention, there is provided a header of a combine harvester, the header comprising a row unit, a stalk chopper, a pair of stalk rolls, and a pair of stripping plates (also referred to herein as "deck plates"). The stalk chopper comprises at least one chopping blade. The header further includes a system for directing a pressurized air flow configured to blow crop material away from the row unit. The flow of air is an upward air blast from the stalk chopper through the stalk rolls. The upward air blast reduces kernel loss from the area of the stripping plates.

In accordance with another exemplary embodiment of the present invention, the upward air blast may be provided by the blade of the stalk chopper being configured such that it will generate the flow of air as an upward air blast. In accordance with another exemplary embodiment, the stalk chopper is mounted to a gearbox which could also be configured to have fins formed into its structure to generate the flow of air as the upward air blast.

In accordance with an exemplary embodiment of the present invention, a stand alone air system can be used instead of configuring a blade of a stalk chopper or a gear box to provide an upward air blast. For example, at least one of the deck plates may comprise air holes that are directional air holes, i.e., they are configured to direct the upward air blast up and to a rear of the header. A tube or hose could be fixed to the header to provide the flow of air used to generate the upward air blast. As another example, the air blast can be directed to the combine end of at least one of the deck plates to further strip seed from gathering chains as they pass around an upper sprocket.

The air flow used to remove crop material in accordance with an exemplary embodiment of the present invention can be supplied on a header with the installation of an air supply system driven from a separate power source or through the combine's hydraulic or electrical system. For example, air transport lines could be built into a hood on a corn header, i.e., the hood could be molded to include air transport lines. The areas configured to have an air exit would have a single hole or as many holes as required to accomplish the desired effect. The holes could be placed at ribs on the hood to blow rearwardly and upwardly slightly to keep grain from falling downwardly towards stalk rolls. The hood profile could also be configured to supply air in an area around a top sprocket to act as a stripper. This would move grain off the gathering chain and into the auger to be transported to the combine. The air blast could also be supplied along transport channels to assist in moving grain away from the stalk rolls.

Alternatively, the system can use the available air supply system on the combine. For example, an air line could be run forward to a feeder face in the same fashion that hydraulic lines to the feeder face are run. The air line from the supply could connect to a header in the same manner as hydraulic lines are connected to the header. The header can be configured to have air lines running to predetermined desired areas that could benefit from assistance in moving grain and MOG (material other than grain) in a desired direction.

BRIEF DESCRIPTION OF THE SEVERAL VIEWS OF THE DRAWINGS

The foregoing summary, as well as the following detailed description of the preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Reference will now be made in detail to the various aspects of the present invention illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the present invention in any manner not explicitly set forth.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the identified element and designated parts thereof. Additionally, the term "a," as used in the specification, means "at least one." The terminology includes the words above specifically mentioned, derivatives thereof, and words of similar import.

"About" as used herein when referring to a measurable value such as an amount, a temporal duration, and the like, is meant to encompass variations of ±20%, ±10%, ±5%, ±1%, or ±0.1% from the specified value, as such variations are appropriate.

The terms "corn," "ear," "stalk," "leaf," and "crop material" are used throughout the specification for convenience and it should be understood that these terms are not intended to be limiting. Thus, "corn" refers to that part of a crop which is harvested and separated from discardable portions of the crop material. The header of the present invention is applicable to a variety of crops, including but not limited to wheat, soybeans and small grains. The terms "debris," "material other than grain," and the like are used interchangeably.

Throughout this disclosure, various aspects of the present invention can be presented in a range format. It should be understood that the description in range format is merely for convenience and brevity and should not be construed as an inflexible limitation on the scope of the present invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the embodiments of the present invention may be combined in any suitable manner in one or more embodiments. One skilled in the relevant art will recognize, in light of the description herein, that the present invention can be practiced without one or more of the specific features or advantages of a particular embodiment. In other instances, additional features and advantages may be recognized in certain embodiments that may not be present in all embodiments of the present invention.

Figure 1:
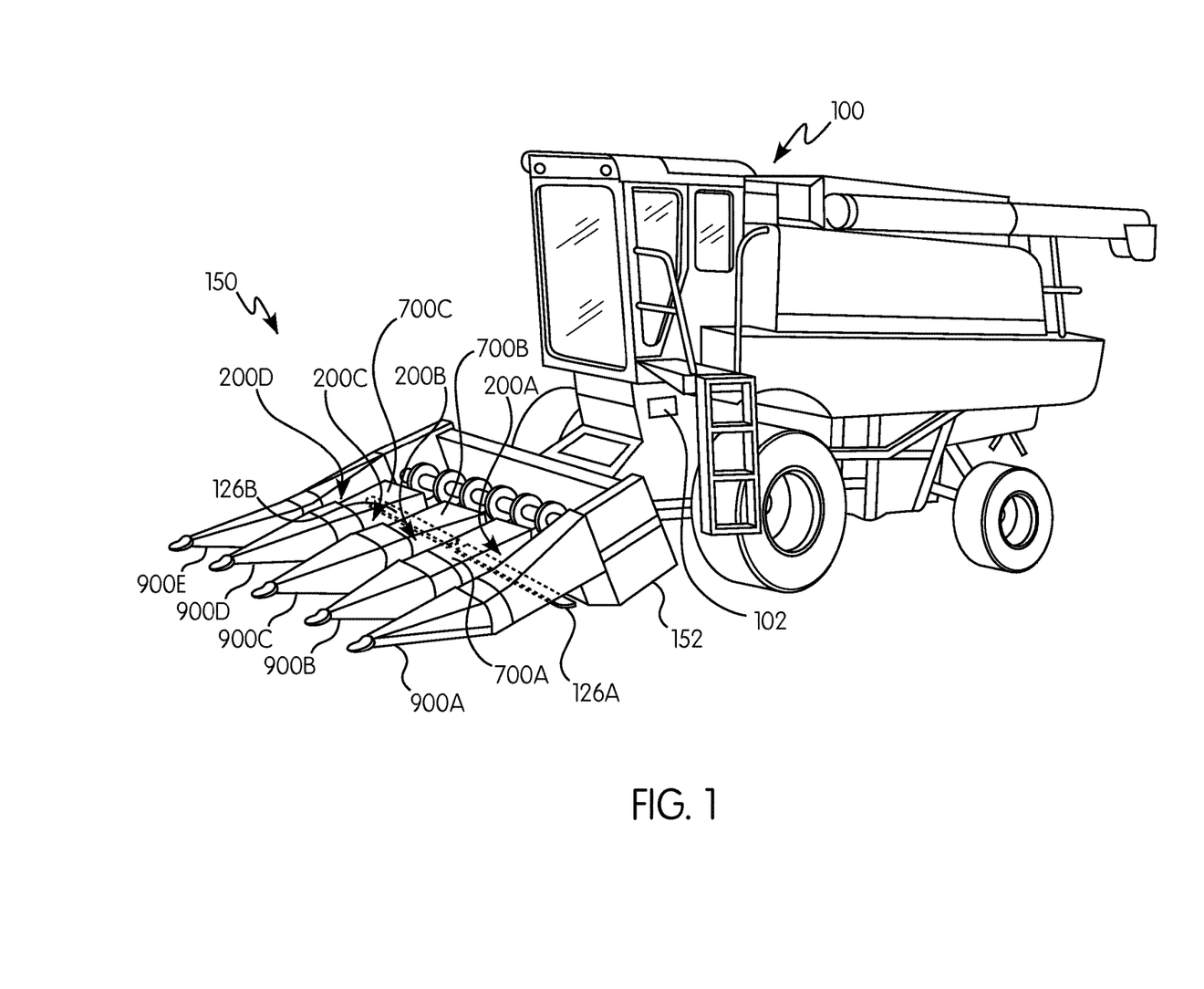
FIG. 1 is a perspective view of a combine harvester in accordance with an exemplary embodiment of the present invention.

Referring now to FIG. 1, there is illustrated a combine harvester, generally designated as 100, in accordance with an exemplary embodiment of the present invention. The combine harvester 100 comprises a header 150 comprising a frame 152 and a plurality of row units 200A-D extending forwardly of the frame 152. The header 150 further comprises row dividers 900A-E and hoods 700A-C. The hoods 700A-C are disposed between adjacent row units 200A-D. The hood 700A is disposed on a left side of the header 150 adjacent to the row unit 200A, and the hood 900C is disposed on a right side of the header 150 adjacent to the row unit 200D. The header 150 includes a frame 152, a row unit 200A extending forwardly of the frame, and a pressurized air flow configured to blow crop material away from the row unit. The row unit includes a deck plate 202A, a hood 700A and a row divider 900B.

Figure 2A:
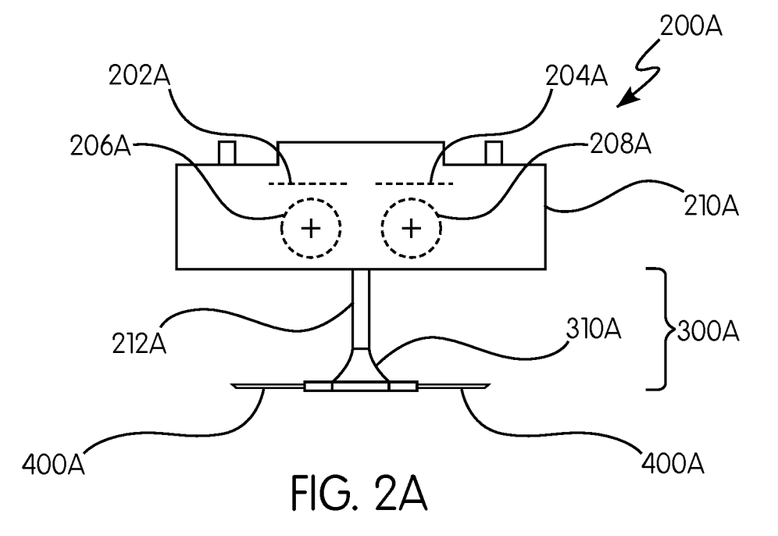
FIG. 2A is a partial schematic rear elevation view of a row unit gearbox and knife mount of a header for a combine harvester in accordance with an exemplary embodiment of the present invention.
Figure 2B:
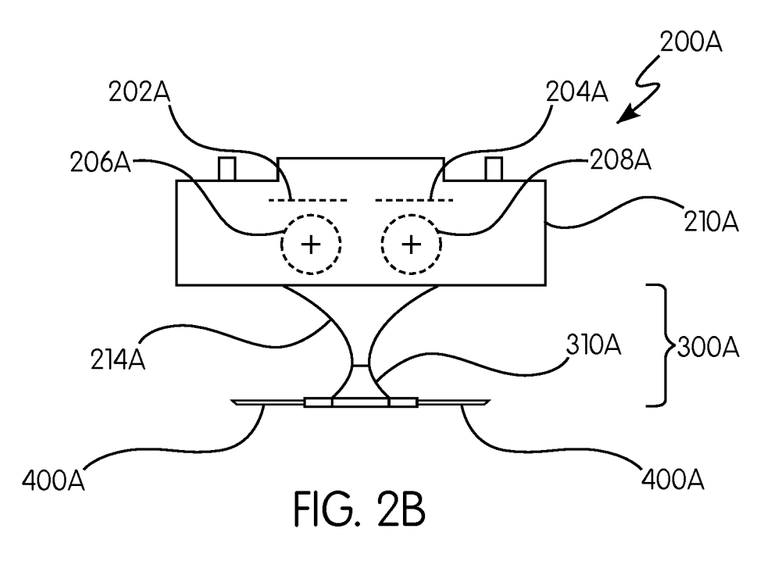
FIG. 2B is a partial schematic rear elevation view of a row unit gearbox and knife mount of a header for a combine harvester in accordance with another exemplary embodiment of the present invention.
Figure 2C:
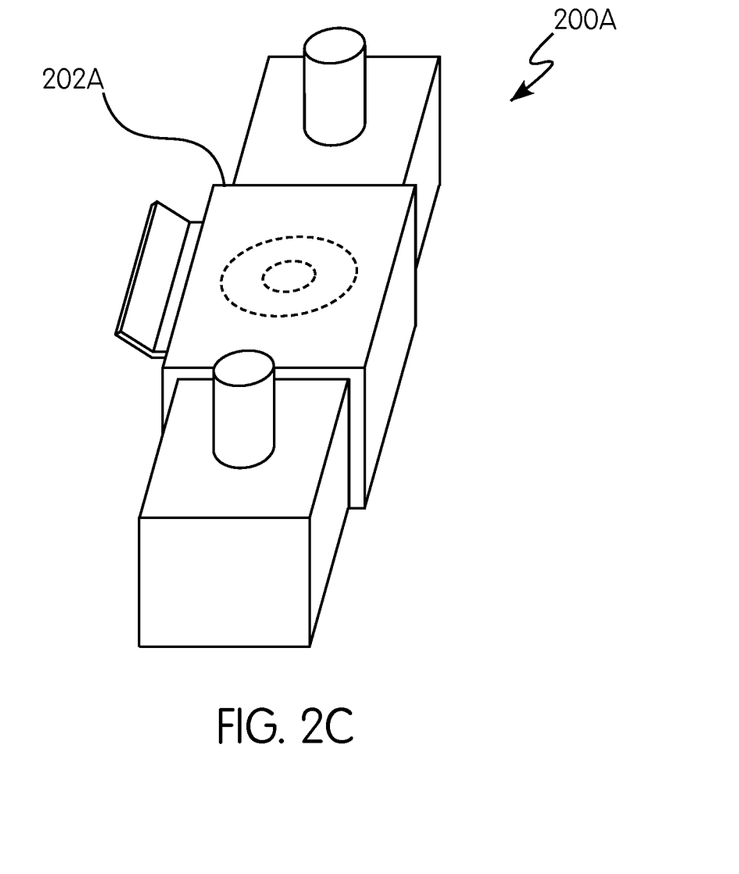
FIG. 2C is a partial perspective view of the row unit gearbox of FIG. 2A in accordance with an exemplary embodiment of the present invention.

Referring now to FIGS. 2A and 2C, there is illustrated an exemplary embodiment of the row unit 200A, in accordance with an exemplary embodiment of the present invention. Although only the row unit 200A is illustrated, it is to be understood that each of the row units 200B-D may include all of the same components as the row unit 200A and be constructed and arranged in the same way.

The row unit 200A comprises a pair of deck or stripper plates 202A and 204A, a pair of stalk rolls 206A and 208A, and a shaft 212A. The row unit 200A further comprises a gear box 210A encasing the components of the row unit 200A, e.g., the pair of deck or stripper plates 202A and 204A and the pair of stalk rolls 206A and 208A.

The row unit 200A further comprises a knife assembly 300A comprising a knife mount 310A and a plurality of blades 400A mounted to the knife mount 310A. The knife assembly 300A is connected to the shaft 212A of the row unit 200A. The knife assembly 300A is mounted or otherwise attached to the row unit 200A.

In accordance with an exemplary embodiment, as shown in FIG. 2A, the knife assembly 300A is positioned below the row unit 200A. In one exemplary embodiment, illustrated in FIG. 2A, the knife mount 310A is connected directly to the shaft 212A of the row unit gearbox 210A. In another exemplary embodiment illustrated in FIG. 2B, the knife mount 310A is connected to the shaft of the row unit 200A via an intermediary mounting 214A. The intermediary mounting 214A may be considered to be part of the row unit 200A or the knife assembly 300A.

Figure 3A:
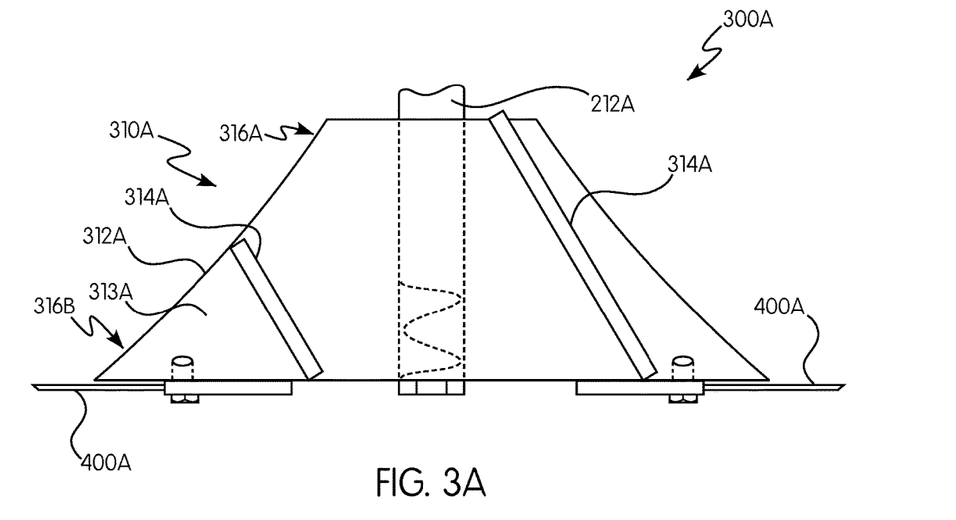
FIG. 3A is an enlarged partial side view of the knife mount of FIG. 2 in accordance with an exemplary embodiment of the present invention.

Referring to FIG. 3A, the knife mount 310A is configured to have a substantially frustoconical body 312A comprising an outer surface 313A. Alternatively, the knife mount 310A can be configured to have a body shaped in any other manner suitable for its intended purpose, e.g., cubical, cylindrical, parallelogram, spherical and the like. The knife mount 310A is connected to the shaft 212A that is operatively connected to and extends from the row unit gearbox 210A. The rotary shaft 212A provides powered rotation of the knife mount 310A.

Along the outer surface 313A of the body 312A of the knife mount 310A, and preferably along an upper portion of the outer surface 313A of the body 312A, the knife mount 310A includes one or more vanes 314A for generating a flow of air as the knife mount rotates 310A. As the vanes 314A are attached to the outer surface 313A of the knife mount 310A, and preferably along an upper portion of the outer surface 313A of the body 312A, the vanes 314A generate a flow of air in a generally upwardly direction as the knife mount rotates. Thus, as the knife mount 310A is positioned below the row unit 200A, the upwardly directed flow of air generated by the knife mount 310A effectively blows crop material away from and off of the row unit 200A.

Figure 3B:
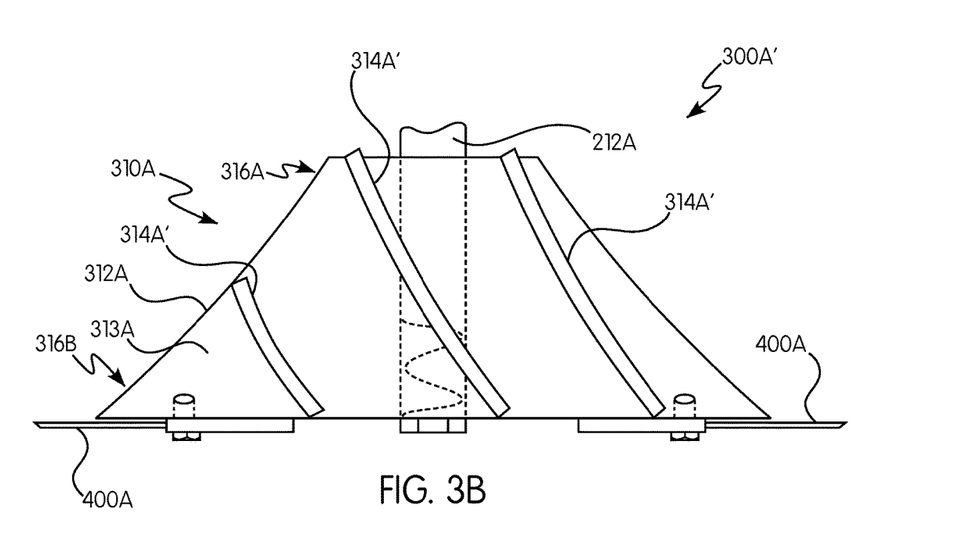
FIG. 3B is an enlarged partial side view of a knife mount in accordance with another exemplary embodiment of the present invention.

The vanes 314A can be of any configuration suitable for generating a flow of air upon rotation. In an exemplary embodiment, the vanes 314A are configured as linear fins, as shown in FIG. 3A. Other embodiments of the vanes 314A are contemplated. For example, in another exemplary embodiment of the knife assembly 300A, which exemplary embodiment is generally designated as 300A' and illustrated in FIG. 3B, the vanes, generally designated as 314A', may be curved e.g., helical. Other configurations of the vanes 314A suitable for its intended purpose are contemplated.

Referring again to FIG. 3A, the vanes 314A can extend along the outer surface of the body 312A from its proximal end 316A to its distal end 316B. Each vane 314A extends along a path extending completely from a most proximal end 316A of the body 312A to a most distal end 316B of the body 312A.

The cutting blades 400A are mounted on the distal end 316B of the knife mount 310A for rotation there with. Although FIG. 3A illustrates that two cutting blades 400A are mounted on the distal end 316B of the knife mount 310A, other numbers of knife blades are contemplated. For example, it is contemplated that the knife assembly 310A may comprise only one knife blade or three or more knife blades.

Figure 4:
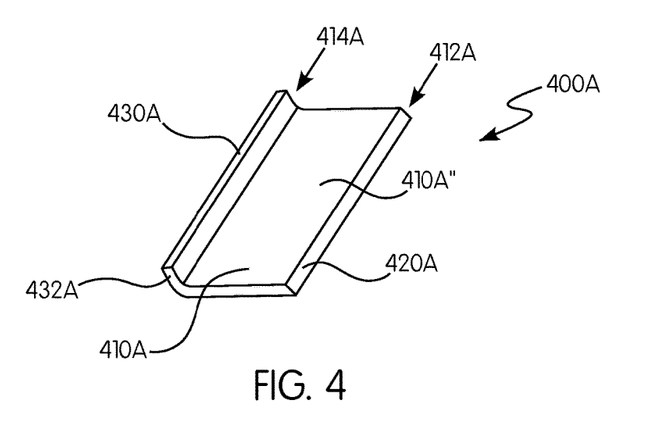
FIG. 4 is a perspective view of a cutting blade for the knife mount of FIG. 1 in accordance with an exemplary embodiment of the present invention.

Referring now to FIG. 4, there is illustrated an exemplary embodiment of each of the knife blades 400A, in accordance with an exemplary embodiment of the present invention. The knife blade 400A includes a main body 410A, a leading cutting edge 420A extending along a first side 412A of the main body 410A, and a tail end 430A extending along a second side 414A of the main body 410A. The leading cutting edge 420A is a sharpened edge configured for cutting crops.

The tail end 430A is configured to generate a flow of air substantially transverse to a major plane of the cutting blade. The tail end 430A includes an upwardly directed portion 432A extending from the main body and generating a flow of air upon rotation. Preferably, the upwardly directed portion 432A extends along the entire length of the second side 414A of the main body 410A. Alternatively, the upwardly directed portion 432A can extend along a portion of the second side 414A or include a plurality of spaced apart upwardly directed portions as shown e.g., in FIG. 4A.

Figure 4A:
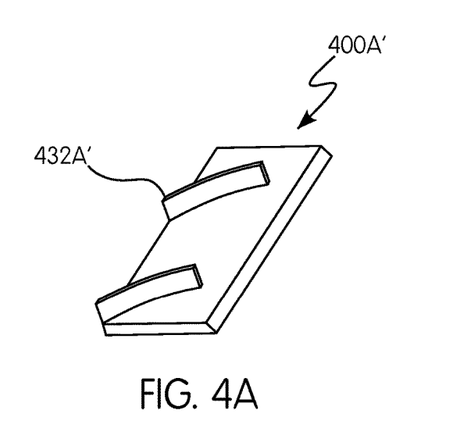
FIG. 4A is a perspective view of a cutting blade for the knife mount of FIG. 1 in accordance with another exemplary embodiment of the present invention.
Figure 4B:
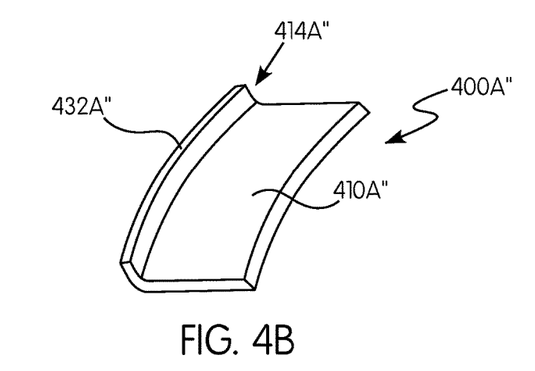
FIG. 4B is a perspective view of a cutting blade for the knife mount of FIG. 1 in accordance with a further exemplary embodiment of the present invention.

The upwardly directed portion 432A is preferably configured as a flange, but can alternatively be configured as any other shape suitable for its intended purpose of generating a flow of air upon rotation. For example, the upwardly directed portion 432A can alternatively be configured as a non-linear flange 432A' e.g., a curved flange of cutting blade 400A', a flange 432A" extending along a curved second side 414A" of the main body 410A" of cutting blade 400A", or a baffle attached to the second side 414A of the main body 410A.

FIGS. 5A-6B illustrate a deck plate having a pressurized air flow configured to blow crop material away in accordance with exemplary embodiments of the present invention. The deck plate is applicable to the header 150 and combine harvester 100 in accordance with an exemplary embodiment of the present invention. Thus, the pressurized air flow from the deck plates blow crop material away from the row unit.

The pressurized air flow can be provided by a compressor 102 on the combine and directed towards the row unit by tubing, piping or baffles. While the compressor is preferably positioned on the combine, it can alternatively be positioned on the header 150 for serving as an independently operable compressor.

Figures 5A, 5B:
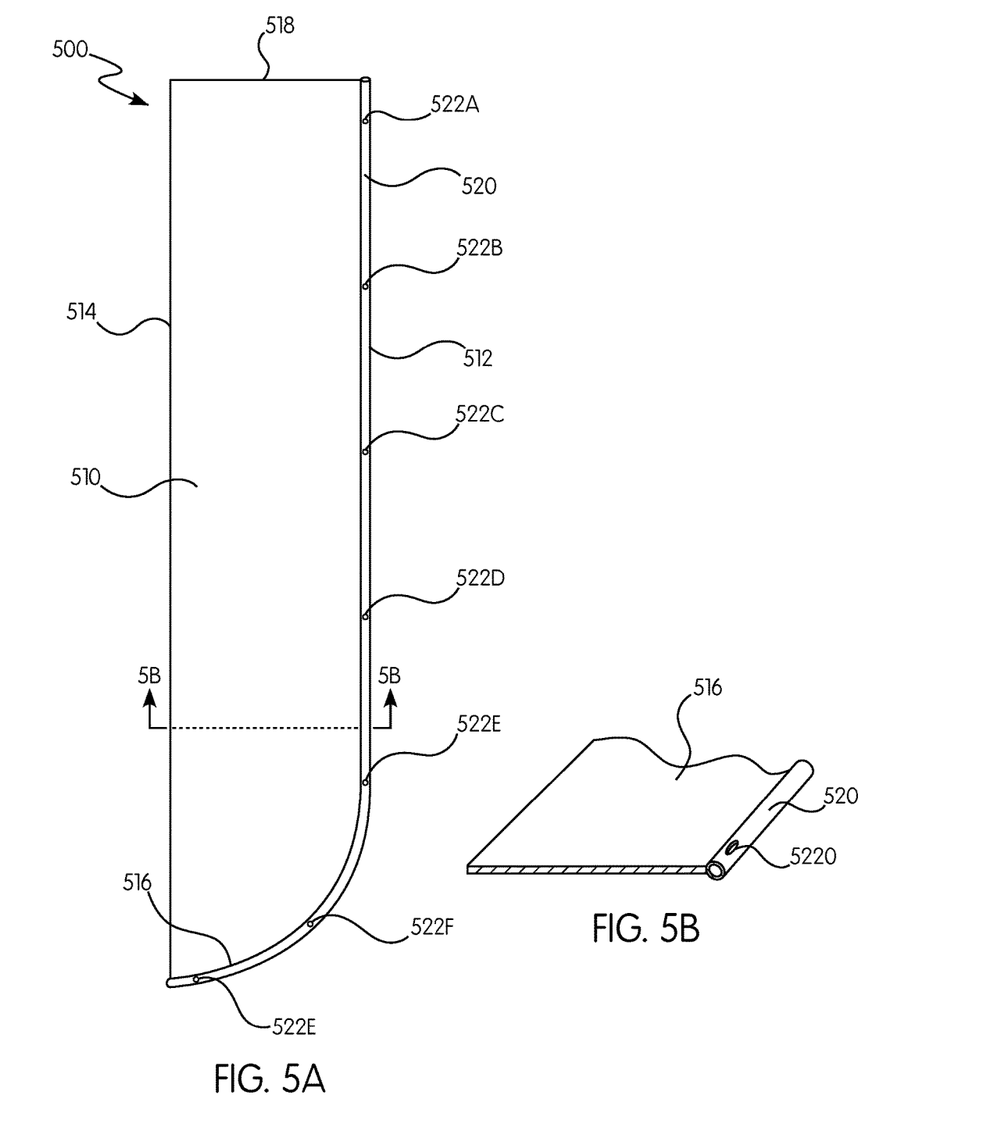
FIG. 5A is a top plan view of a deck plate, in accordance with an exemplary embodiment of the present invention.
FIG. 5B is a partial perspective cross-sectional view of a deck place in accordance with another exemplary embodiment of the present invention.

FIG. 5A illustrates a plan view of a deck plate, generally designated as 500, in accordance with an exemplary embodiment of the present invention. FIG. 5B illustrates a perspective view of a cross-section of the deck plate 500 taken along a line 5B-5B in FIG. 5A, in accordance with an exemplary embodiment of the invention. Each of the deck plates 202A and 204A may be configured as the deck plate 500. However, it is to be understood that the deck plates 202A and 204A are mirror images of one another. Thus, while the deck plate 202A is configured as the deck plate 500 is shown in FIG. 5, it is understood that the deck plate 204A can be configured as a mirror image of the deck plate 500.

The deck plate 500 comprises a body 510 having an inside edge 512, an outside edge 514, a front edge 516, and a rear edge 518. Overall, the deck plate is a substantially planar plate. The deck plate can be configured to have a curved or tapered transition extending from the inner edge towards the front edge so as to define a wider lead opening when paired with an opposing deck plate. The inside edge 512 engages with a crop, such as corn to strip ears of corn from the stalk of the corn crop. The deck plate 500 further comprises air channel 520 disposed along the inside edge 512 of the body 510. The air channel 520 is configured to receive pressurized air flow to blow crop material away from the deck plate 500. For example, the air channel is configured to be in fluid communication with and receive pressurized air from the compressor 102.

The air channel 520 can be configured as a tubular air channel in fluid communication with a source of pressurized air flow. The air channel 520 comprises a plurality of apertures 522A-G specifically positioned and oriented along the air channel 520 to blow crop material away from the deck plate 500, and towards the rear edge 518 of the deck plate 500 or upwardly and rearwardly of the deck plate. In an exemplary embodiment, the air channel 520 extends along the entire inside edge 512 and front edge 516 of the deck plate 500, although it is contemplated that in other exemplary embodiments the air channel 520 extends along only a portion of the inside edge 510, along the entire inside edge 512 and only a portion of the front edge 516, along only a portion of the inside edge 510 and the entire front edge 516, or along only a portion of the inside edge 510 and the front edge 516. As illustrated, the plurality of apertures 522 are spaced apart along the entire length of the air channel 520, although embodiments in which the plurality of apertures 522 are not spaced along the entire length of the air channel 520 are contemplated.

Figure 5C:
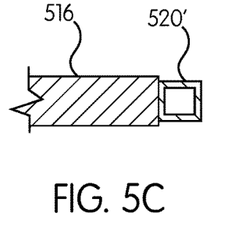
FIGS. 5C-5E are cross-sectional views of air channels applicable to exemplary embodiments of the present invention.
Figure 5D:
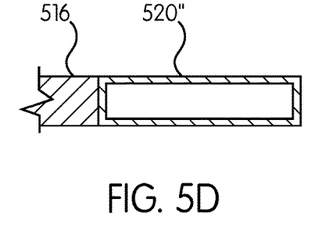
Figure 5E:
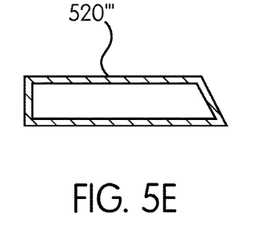

While the air channel 520 is shown in FIGS. 5A and 5B as a tubular air channel, the air channel can alternatively be configured to be a tubular air channel having a longitudinal cross-sectional of a square 520' (FIG. 5C), a rectangle 520" (FIG. 5D), a trapezoid 520''' (FIG. 5E), and the like. Additionally, the overall thickness of the air channel can be configured to have a height that is greater than an overall thickness of the deck plate (as shown in FIG. 5B), a height that is less than an overall thickness of the deck plate (as shown in FIG. 5C), or a height that is the same as an overall thickness of the deck plate (as shown in FIG. 5D). The longitudinal length of the air channel is generally shaped to match the inside edge of the deck plate or a combination of the inside edge and front edge of the deck plate.

Figure 6A:
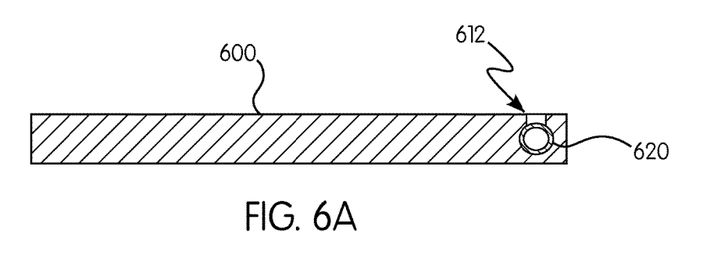
FIGS. 6A and 6B are cross-sectional views of deck plates applicable to an exemplary embodiments of the present invention.
Figure 6B:
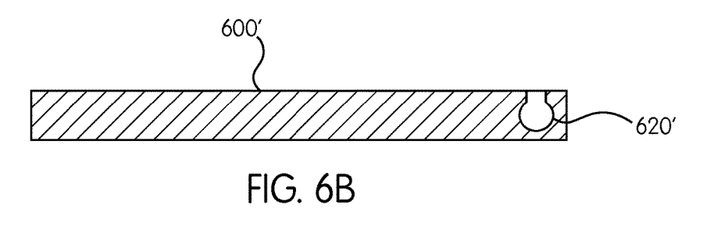

FIGS. 6A and 6B illustrate further exemplary embodiments of a deck plate in accordance with the present invention. In FIG. 6A the air channel 620 is housed within a deck plate 600 adjacent an inside edge 612 of the deck plate, with corresponding apertures formed in the deck plate that corresponds with apertures in the air channel. In FIG. 6B the air channel 620' is itself formed by the deck plate 600'. Alternatively, the deck plate can be configured to have an air channel formed via air channel 620 in combination with portions of the air channel formed by the deck plate itself.

Any of the air channels discussed above e.g., 520, 520', 520", 520''', 620 can be formed out of any material suitable for its intended purpose. For example, the air channels can be formed out of metal so as to serve as a rigid surface against which ears of corn can be stripped from stalks, or out of a flexible plastic so as to be deformable and resilient. The air channels may also be formed from the same material forming the deck plate.

Figure 7A:
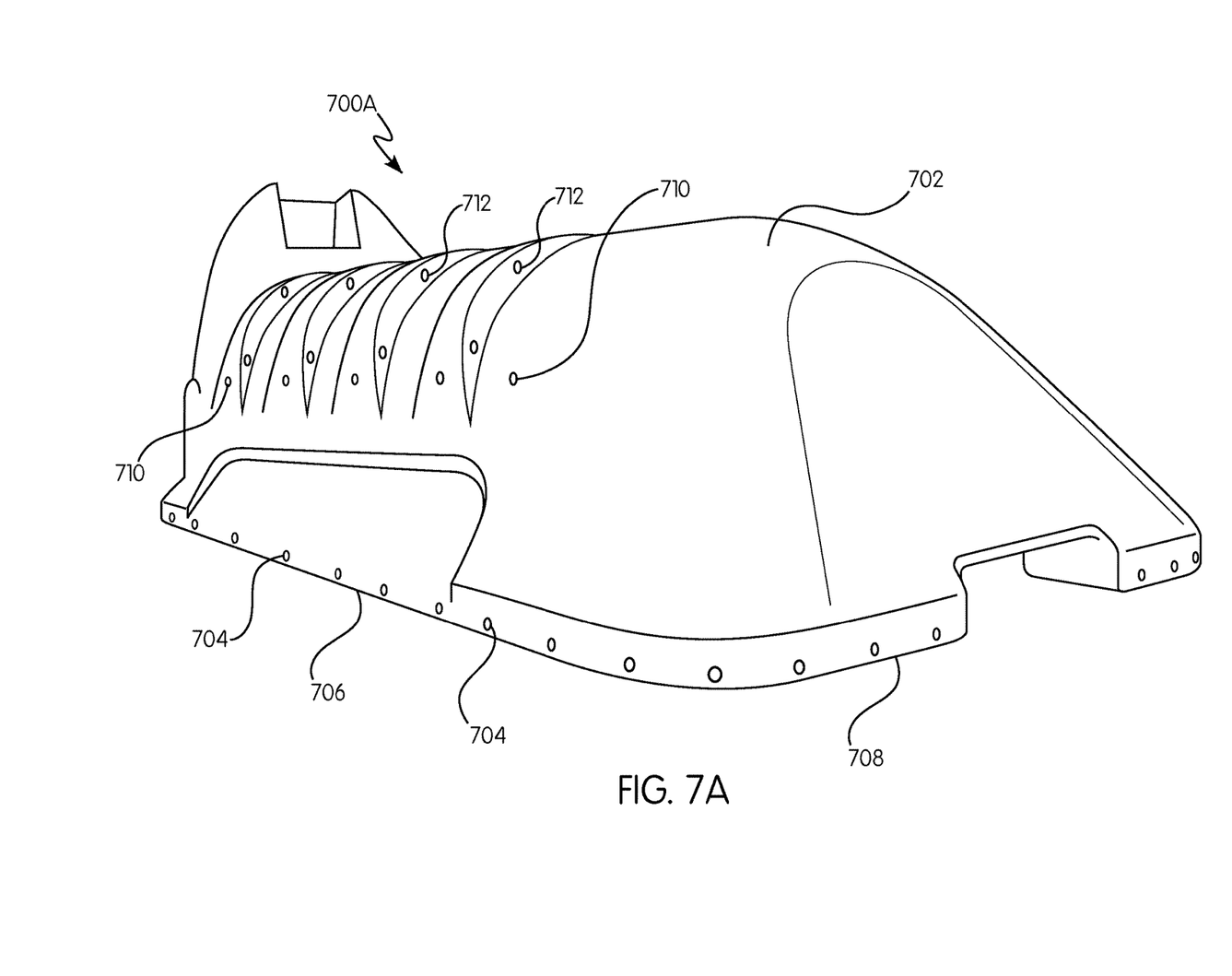
FIG. 7A is a rear perspective view of a hood of a header for a row unit in accordance with an exemplary embodiment of the present invention.
Figure 7B:
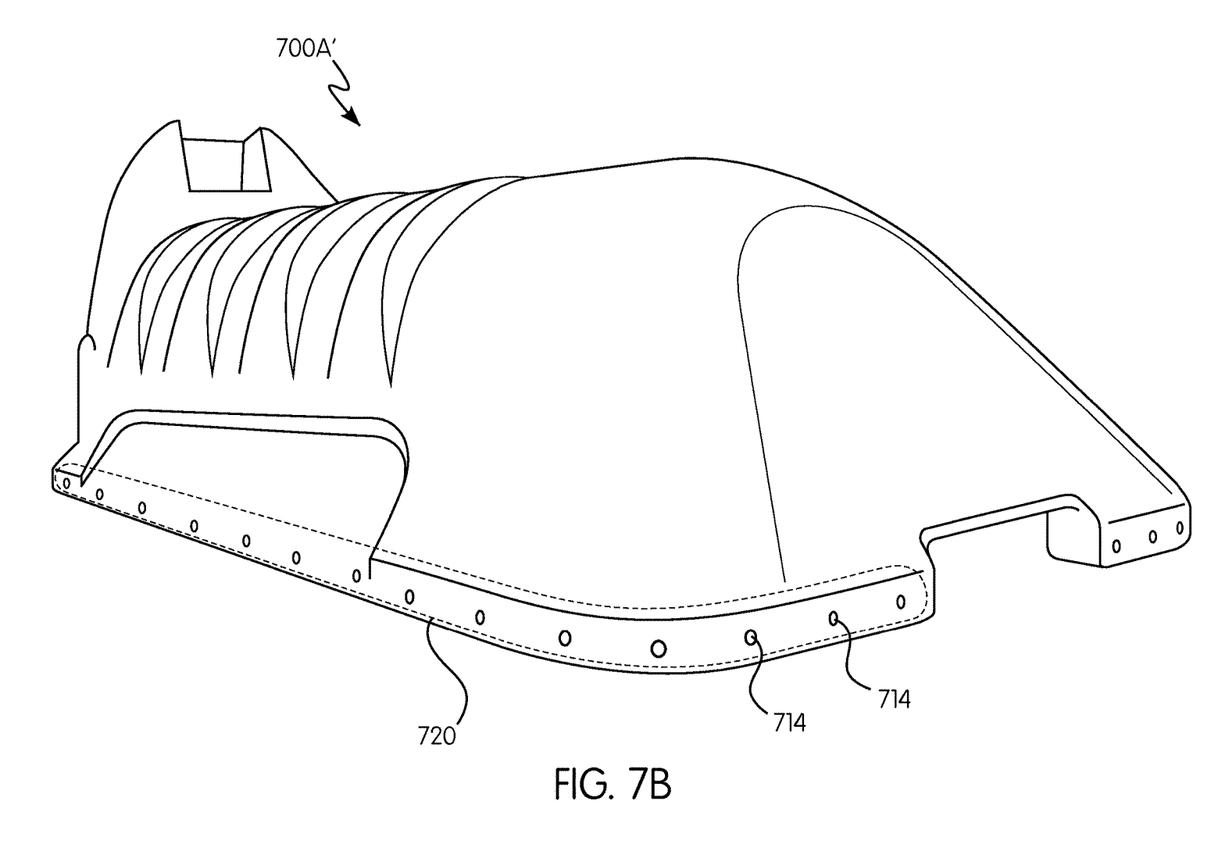
FIG. 7B is a rear perspective view of a hood of a header for a row unit in accordance with another exemplary embodiment of the present invention.
Figure 8A:
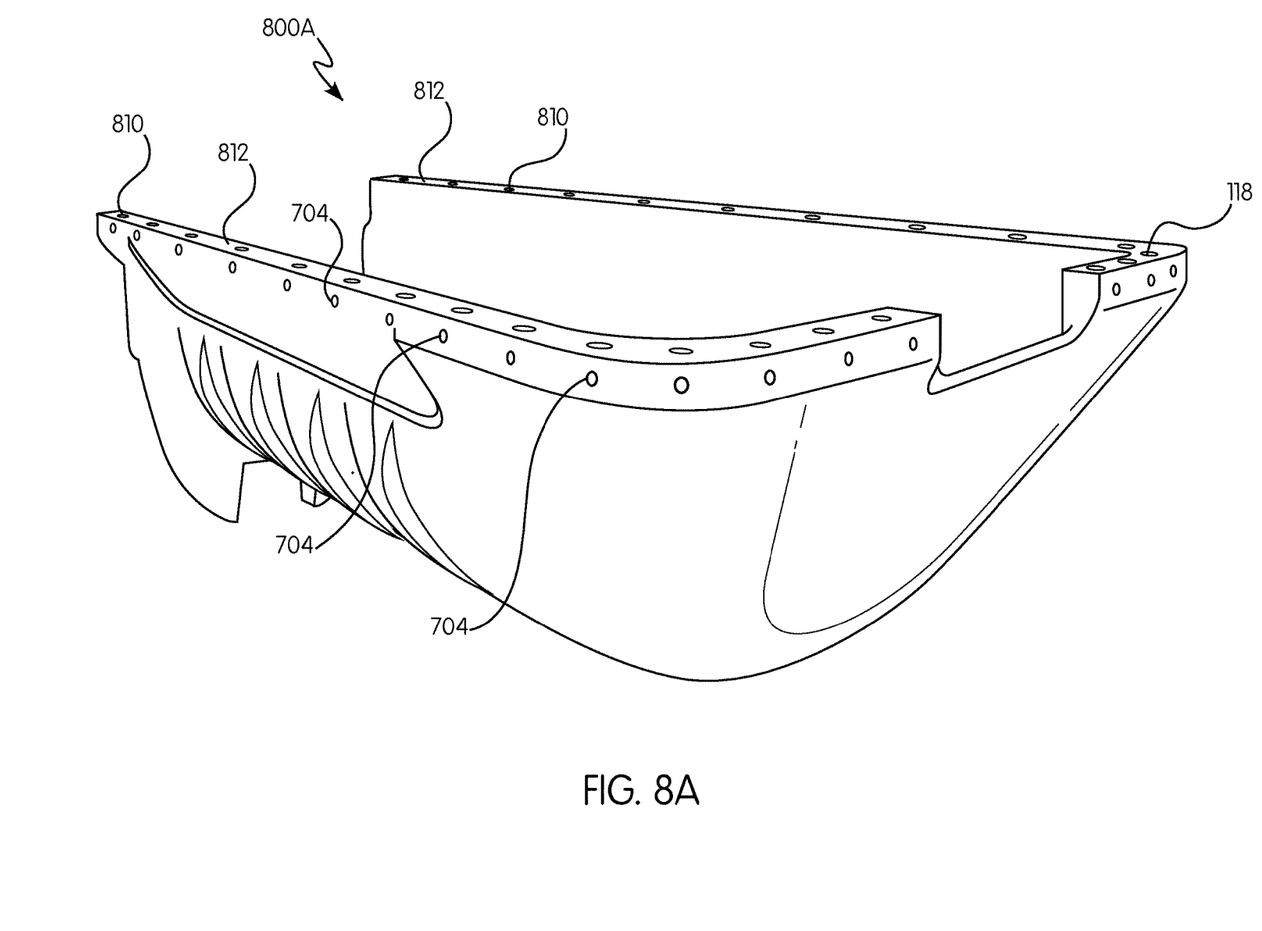
FIG. 8A is a bottom perspective view a hood of a header for a row unit in accordance with an exemplary embodiment of the present invention.
Figure 8B:
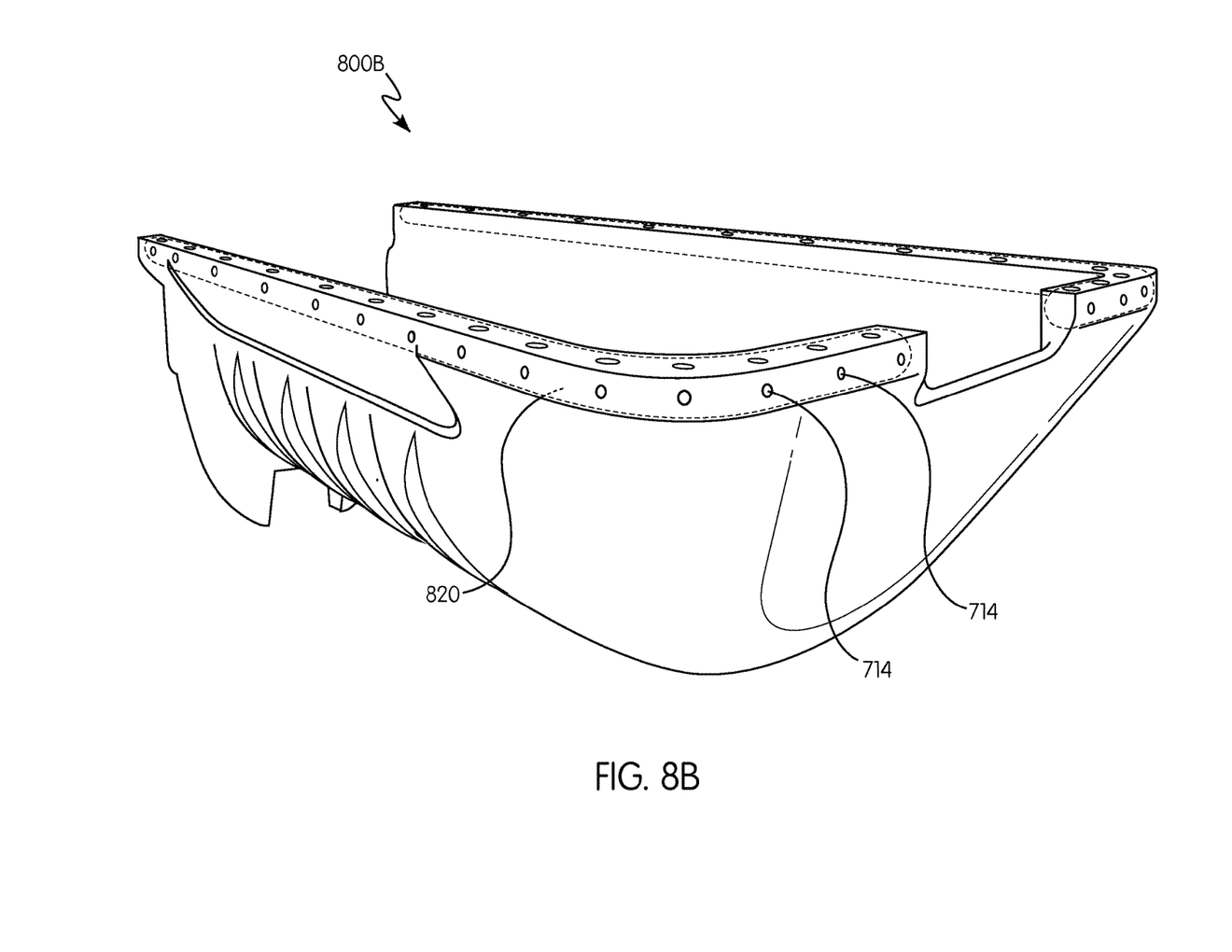
FIG. 8B is a bottom perspective view of a hood of a header for a row unit in accordance with another exemplary embodiment of the present invention.

Referring to FIGS. 7A-8B, the hood 700A, in an exemplary embodiment of the present invention, is a hollow hood configured to receive the pressurized air flow e.g., from the compressor 102. An interior hollow region 702 of the hood is pressurized by the flow of pressurized air received therein. Alternatively, the hood can be a non-hollow hood configured to receive an air channel 720 (FIGS. 7B and 8B).

The hood 700A includes a plurality of spaced apart apertures 704 in fluid communication with an interior of the hood for allowing the discharge of the pressurized air within the hood. This discharge of pressurized air through the plurality of apertures 704 effectively blows crop material away from the hood and neighboring row unit components. The plurality of apertures 704 can also be positioned to extend along a bottom edge of the hood. As shown in FIG. 7A, the plurality of apertures 704 extend along a bottom lateral edge 706 and a bottom rear edge 708 of the hood.

As shown in FIG. 8A, in accordance with another exemplary embodiment of the present invention, the hood 800A includes a plurality of apertures 810 extend along an bottom edge surface 812 of the hood. While the hood 800A is shown to include apertures 810 and 704, the hood 800A can be configured with apertures 810 alone or in combination with apertures 704.

Alternatively, the plurality of apertures on the hood can be positioned along a variety of positions about the hood e.g., anywhere along the entire top surface (e.g., apertures 710) of the hood or along a rearwardly facing surface (e.g., apertures 712) of a grain retaining hood structure.

In the exemplary embodiments shown in FIGS. 7B and 8B, the hood includes the air channel 720, 820 respectively, for receiving the pressurized air flow to blow crop material away from the hood. The air channels 720, 820 are similarly configured as air channel 520. The air channel is positioned internally within the hood and has a plurality of apertures aligned with a plurality of apertures e.g., 714, formed in the hood.

Figure 9A:
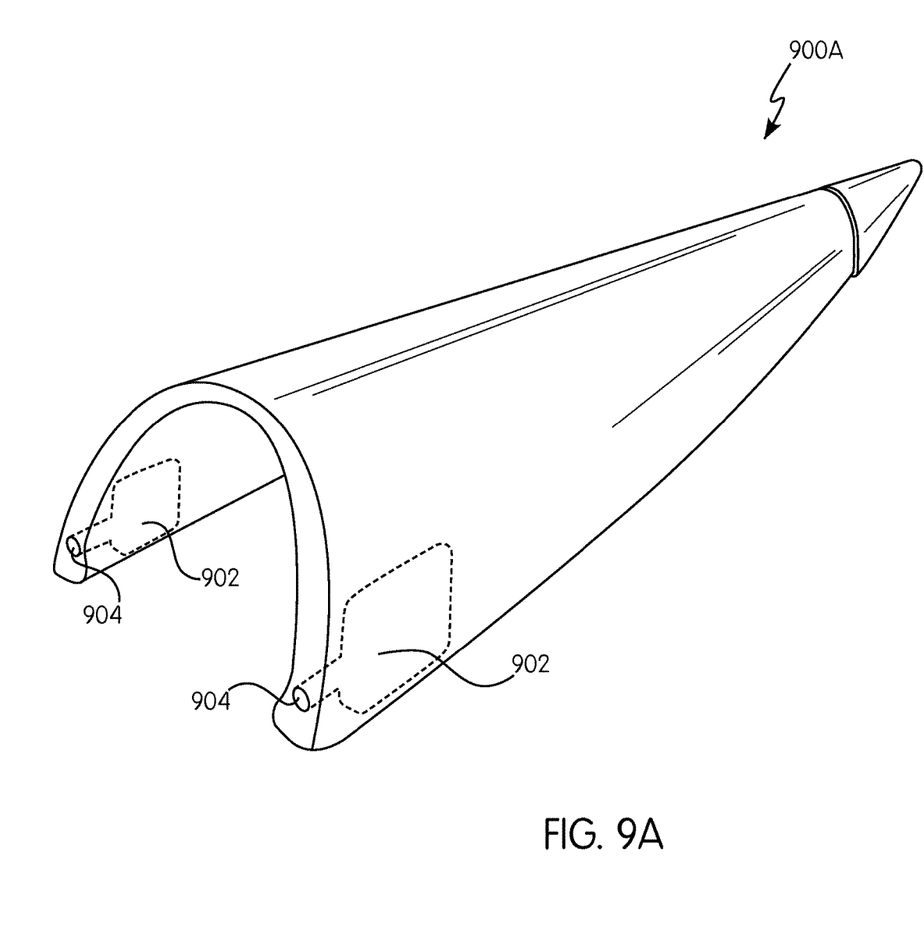
FIG. 9A is a rear perspective view of a row divider in accordance with an exemplary embodiment of the present invention.

Referring to FIG. 9A, in accordance with an exemplary embodiment of the present invention, the row divider 900A can be configured substantially as any conventional row divider, but includes a plenum 902 about its rear lateral portion for receiving pressurized air flow. The row divider further includes an aperture 904 for discharging the pressurized air within the plenum to blow crop material away from and rearwardly of the row divider. The aperture 904 is oriented and aligned to direct the flow of discharging pressurized air in a generally rearward direction.

Figure 9B:
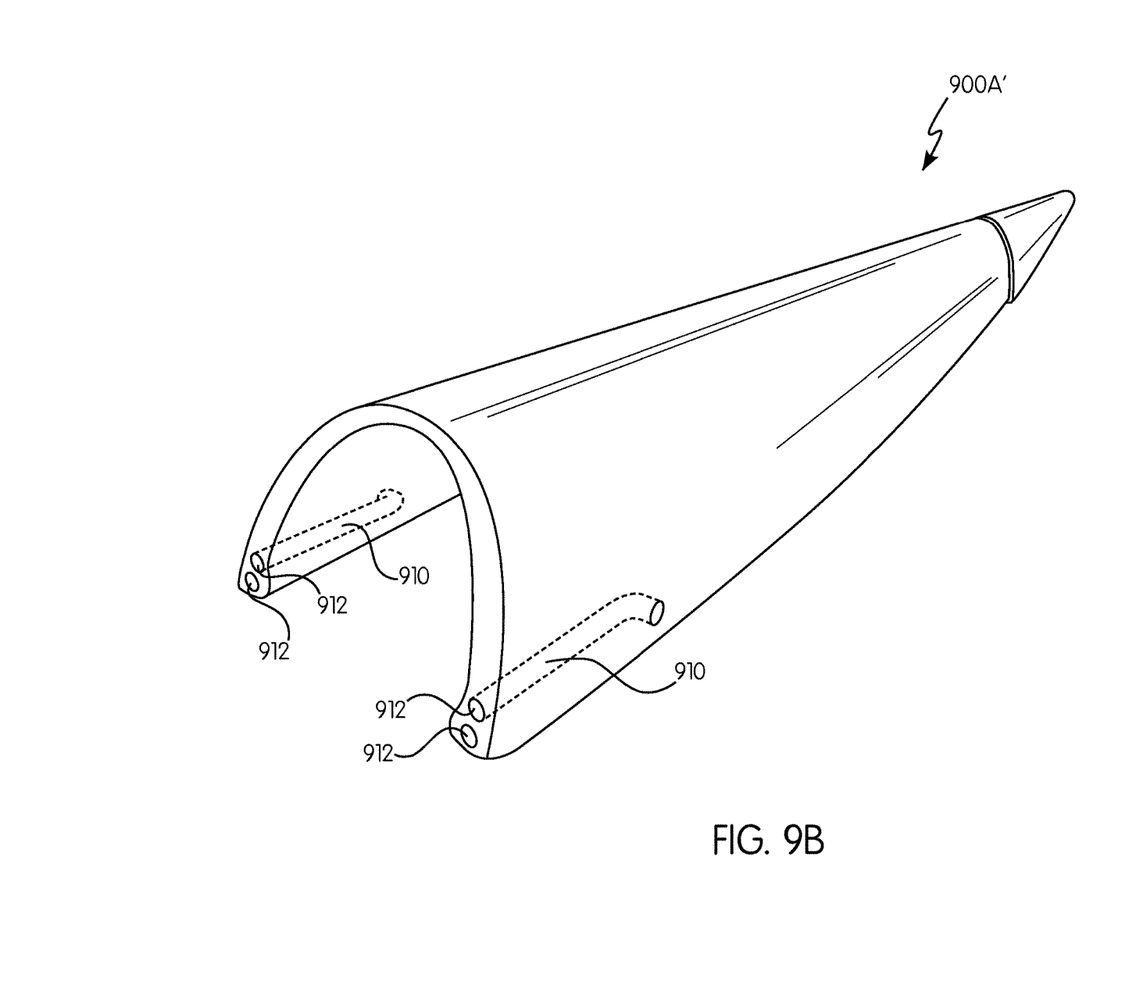
FIG. 9B is a rear perspective view of a row divider in accordance with another exemplary embodiment of the present invention.

Referring to FIG. 9B, in accordance with another exemplary embodiment of the present invention, the row divider 900A' can include an air channel 910, similar to air channels 520, 720 described above. The air channel receives pressurized air flow to blow crop material away from the row divider. Specifically, the air channel includes an aperture aligned with the aperture 912 of the row divider to blow crop material away from the row divider. Alternatively, the row divider can include a plurality of air channels and apertures 912.

Referring back to FIG. 1, the header can alternatively include a baffle 126A configured to receive and direct the pressurized air flow upwardly towards the row unit. In this exemplary embodiment, the pressurized air flow from the compressor is directed towards the baffle by appropriate means e.g., tubing or duct work, and the baffle directs the pressurized air flow towards the row unit. The baffle is preferably positioned below the row unit but can alternatively be positioned in line with the row unit. The baffle can be a single unitary baffle extending entirely across a width of the header, or a plurality of baffles or baffle segments 126A, 126B.

The foregoing exemplary embodiments of the knife mount, knife assembly, cutting blades, deck plates, air channels, hoods, row dividers, and baffle discussed above can be used singularly or in one or more combinations with each other. For example, a header in accordance with an exemplary embodiment of the present invention can be configured with one or more of the knife mount, knife assembly, cutting blades, deck plates, air channels, hood, row dividers, and baffle discussed above. Further, the header in accordance with an exemplary embodiment of the present invention can be configured with one or more embodiments of respective components e.g., knife mount, knife assembly, cutting blade, deck plate, and air channel discussed above. That is, the header having a plurality of row units, can be configured with one row unit have one embodiment of the knife mount e.g., 300A, while another row unit includes another embodiment of the knife mount e.g., 300A'. Likewise, one row unit can be configured to include one embodiment of the cutting blade e.g., 400A, while another row unit includes another embodiment of the cutting blade e.g., 400A".

While the present invention has been described with reference to the foregoing exemplary embodiments, it will be appreciated by those skilled in the art that various changes may be made and equivalents may be substituted for elements thereof without departing from the scope of the present invention. In addition, modifications may be made to adapt a particular situation or material to the teachings of the present invention without departing from the essential scope thereof. It is to be understood, therefore, that the present invention not be limited to the particular aspects disclosed, but it is intended to cover modifications within the spirit and scope of the present invention as defined by the appended claims.

We claim:

1. A header of a combine harvester comprising:
    a row unit that includes a pair of stalk rolls;
    a knife mount mounted to the row unit; and
    a cutting blade mounted to the knife mount, the cutting blade having:
        a leading cutting edge,
        a tail end opposite the leading cutting edge, and
        an upwardly directed portion extending from the tail end configured to generate a flow of air, wherein the leading cutting edge is forward the tail end upon rotation of the knife mount.

2. The header of claim 1, wherein the knife mount is positioned directly below a row unit mounted to the frame.

3. The header of claim 1, wherein the cutting blade includes a substantially planar main body having the leading cutting edge along a first side of the main body, the tail end along a second side of the main body opposite the first side, and wherein the upwardly directed portion extends substantially transverse from the main body.

4. The header of claim 3, wherein the upwardly directed portion extends along an entire length of the second side of the main body.

5. The header of claim 1, wherein the knife mount includes a vane for generating a flow of air.

6. The header of claim 5, wherein the vane is attached to an outer surface of the knife mount for generating a flow of air in a generally upwardly direction.

7. The header of claim 1, wherein the knife mount has a substantially frustoconical body.

8. The header of claim 7, wherein the knife mount includes a vane mounted to the substantially frustoconical body.

9. The header of claim 5, wherein a longitudinal edge of the vane is directly mounted to the knife mount.

10. The header of claim 5, wherein the vane is a curved vane and/or a helical vane.

11. The header of claim 1, wherein the upwardly directed portion is curved.

12. The header of claim 1, wherein the cutting blade includes a plurality of upwardly directed portions.

13. The header of claim 12, wherein each of the plurality of upwardly directed portions are spaced apart.

14. The header of claim 1, wherein the upwardly directed portion extends along a top surface of the cutting blade along a substantially widthwise extent of the cutting blade that is transverse to a longitudinal axis of the cutting blade.

15. The header of claim 1, wherein the upwardly directed portion extends along a top surface of the cutting blade in a curved direction in a substantially widthwise extent of the cutting blade that is transverse to a longitudinal axis of the cutting blade.

16. The header of claim 2, wherein the knife mount is connected to a shaft assembly below and between the pair of stalk rolls.

17. The header of claim 16, wherein the row unit further includes a gear box operatively connected to the shaft.

* * * * *